Sept. 12, 1933.    J. F. FILIPPI ET AL    1,926,517
WELDED HIGH PRESSURE RENEWABLE PIPE JOINT
Filed June 26, 1930

Inventors
JOHN F. FILIPPI
PERCY B. LEVITT
CYRILL A. M. MASEK
By their Attorney
Edmund G. Borden Patented Sept. 12, 1933

1,926,517

UNITED STATES PATENT OFFICE 1,926,517

WELDED HIGH PRESSURE RENEWABLE PIPE JOINT

John F. Filippi, Woodside, Cyrill A. M. Masek, New York, and Percy B. Levitt, Jackson Heights, N. Y., assignors to Doherty Research Company, New York, N. Y., a corporation of Delaware Application June 26, 1930. Serial No. 463,874

5 Claims. (Cl. 285—111)

This invention relates to a means for forming a joint between the ends of cylindrical objects and more particularly to a joint adapted to form a coupling between the ends of sections of metallic pipe.

It is among the objects of this invention to provide a coupling which shall be simple and economic in construction, which may be readily assembled and fastened or unfastened and which, while avoiding the use of gaskets and packing, shall be fluid-tight at the highest pressure the pipe sections are capable of withstanding.

It is a further object of the invention to provide a coupling which may be joined by means of a simple welding apparatus and which may be unfastened by means of an oxyacetylene or other torch without injuring the material of the pipe.

It is a further object of this invention to provide a welded pipe joint which may be broken and remade as often as desired.

It is a further object of this invention to provide a coupling of the type described in which the pipe is protected from the entry of foreign matter at the time the joint is made or broken.

These and other objects of the invention will be more fully described in connection with the accompanying drawing in which.

Figure 1:
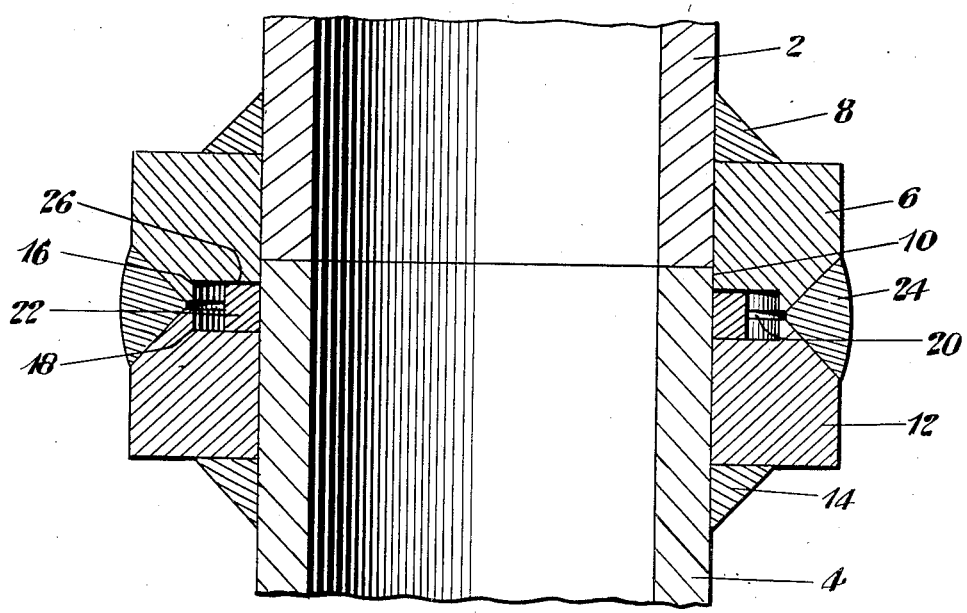
Fig. 1 represents a longitudinal section through a pipe joint constructed in accordance with this invention.

Referring to Fig. 1, reference numerals 2 and 4 indicate two straight end pipe sections. Section 2 is provided with a collar 6 about the exterior thereof rigidly attached thereto preferably by means of a weld as indicated at 8. The collar 6 projects slightly beyond the end of pipe section 2 to provide a socket portion 10 adapted to accommodate the end of pipe 4.

The pipe 4 has a collar 12 rigidly attached on the exterior thereof preferably by means of a weld 14. The collar 12 is attached to the pipe section 4 at a distance back from the end thereof far enough to permit the straight end of the pipe 4 to enter into the socket portion 10.

The collars 6 and 12 are recessed as indicated at 16 and 18 to provide therebetween a pocket 20.

The pocket 20 is adapted to accommodate a ring 22, preferably of cast iron. The ring 22 only partially fills the pocket 20 leaving an annular air chamber between the outer surface of the ring and the weld 24 which units collars 6 and 12.

By this construction the ring 22 acts as a shield to prevent the cutting flame from injuring either of the pipe sections 2 or 4 and being of cast iron is more resistant to the action of a cutting flame than is steel, which it is most desirable to use in the construction of the pipe sections themselves. The annular chamber about the exterior of the shield prevents the molten metal from contacting with the surface of the shield during the welding or cutting of weld 24. A slight clearance 26 is also provided between the ring 22 and the collar 6 to permit the free expansion of the ring when the welding or cutting flame is applied.

In this construction the welds 8 and 14 are intended to be of a permanent nature and such welds may be made without injury to the material of the pipes 2 and 4. The weld 24 may be made and cut open with an oxy-acetylene or other torch as often as desired without danger of this repeated heating injuring the steel of the pipe sections and without danger of foreign matter from the welding or cutting flame entering the pipe.

Figure 2:
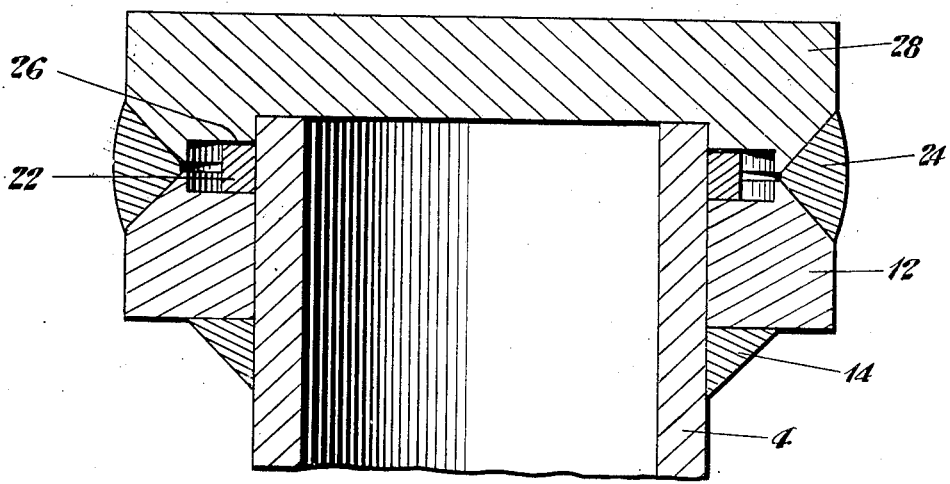
Fig. 2 represents a longitudinal section through the end of a pipe section and a cap for the same which are coupled in accordance with this invention.

Fig. 2 illustrates how a cap 28 may be applied to one of the pipe sections such as 4 by a coupling which is in all respects similar to that described in connection with Fig. 1.

While there have been herein described but two applications of the present invention it will be readily understood that the coupling is suitable for use in numerous other applications where a renewable joint is desired.

Having thus described the invention what is claimed as new is:

1. A joint structure including two abutting elements, a weld uniting said elements, said structure having a pocket adjacent the line of weld and a shield within said pocket intermediate said weld and one of said elements.

2. A joint structure including two pipe sections, a weld uniting said sections, said structure having a pocket intermediate said weld and one of said pipe sections, and a shield within said pocket.

3. A joint structure including two abutting elements, a weld uniting said elements, said structure having a pocket adjacent to the line of weld and a shield of cast iron within said pocket intermediate said weld and one of said elements.

4. A joint structure including two abutting elements, a weld uniting said elements, said structure having a pocket adjacent to the line of weld and a shield of cast iron partially filling said pocket.

5. A joint structure including two abutting elements, a weld uniting said elements, said structure having a pocket adjacent to the line of weld, and a shield within said pocket, said shield having a small clearance with the walls of said pocket to permit thermal expansion thereof when welding heat is applied to said structure.

JOHN F. FILIPPI.
CYRILL A. M. MASEK.
PERCY B. LEVITT.